(12) United States Patent
Li et al.

(10) Patent No.: US 6,195,714 B1
(45) Date of Patent: Feb. 27, 2001

(54) SYSTEM FOR TRANSFERRING STM CALLS THROUGH ATM NETWORK BY CONVERTING THE STM CALLS TO ATM AND VICE VERSA AT THE EDGE NODES OF ATM NETWORK

(75) Inventors: Li Li; Todd Douglas Morris, both of Kanata (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/092,847

(22) Filed: Jun. 8, 1998

(51) Int. Cl.[7] ................................................ G06F 13/38
(52) U.S. Cl. .................... 710/31; 710/105; 710/131; 370/352; 370/395; 370/400; 370/466
(58) Field of Search ..................... 370/395, 396, 370/400, 401, 465, 466, 467, 352, 354; 710/11, 105, 106, 131, 31, 32; 709/238

(56) References Cited

U.S. PATENT DOCUMENTS

| | | | |
|---|---|---|---|
| 4,730,311 | * 3/1988 | Carse et al. | 370/110.1 |
| 5,463,621 | 10/1995 | Suzuki | 370/60 |
| 5,568,475 | 10/1996 | Doshi et al. | 370/58.2 |
| 5,627,836 | * 5/1997 | Conoscenti et al. | 370/397 |
| 5,812,786 | * 9/1998 | Seazholtz et al. | 709/233 |
| 5,864,539 | * 1/1999 | Yin | 370/236 |
| 5,903,559 | * 5/1999 | Acharya et al. | 370/355 |
| 5,956,337 | * 9/1999 | Gaddis | 370/395 |
| 6,009,097 | * 12/1999 | Han | 370/395 |

FOREIGN PATENT DOCUMENTS

04180323 * 6/1992 (JP).

* cited by examiner

Primary Examiner—Thomas C. Lee
Assistant Examiner—Thuan Du
(74) Attorney, Agent, or Firm—Max R. Wood (57) ABSTRACT

A method and apparatus for transferring data associated with synchronous transfer mode (STM) calls through an asynchronous transfer mode (ATM) network are described. The apparatus includes a voice interface control unit, a signaling interface and a TDM peripheral device associated with each edge node in the ATM network. The voice interface control unit controls the ingress and egress of STM calls to the network. The signaling interface sends and receives common channel signaling messages associated with calls originating in the STM network and passes message content to the voice interface control unit. The TDM peripheral device converts STM network and passes message content to the voice interface control unit. The TDM peripheral device converts STM calls to ATM cells, and vice versa. The method disclosed involves enabling the network interface controls at edge nodes in the ATM network with a capacity to receive, interpret and send common channel signaling messages associated with STM cells, while using native ATM signaling, such as P-NNI within the ATM network. The advantage is the ability to transfer STM data through an ATM network without modifying the ATM network itself. The ATM network can therefore be utilized to its fullest extent as a multi-service backbone network. SVC and cross-connect caching can also be used, which further enhances network performance and resource utilization.

15 Claims, 7 Drawing Sheets

SYSTEM FOR TRANSFERRING STM CALLS THROUGH ATM NETWORK BY CONVERTING THE STM CALLS TO ATM AND VICE VERSA AT THE EDGE NODES OF ATM NETWORK

TECHNICAL FIELD

This invention relates generally to synchronous transfer mode (STM) call completions and, in particular, to the completion of calls which originate and terminate in an STM network but at least a portion of the call connection is completed using an asynchronous transfer mode (ATM) network.

BACKGROUND OF THE INVENTION

The public switched telephone network (PSTN) is a synchronous transfer mode (STM) network in which time division multiplex (TDM) switches are interconnected by transport links commonly referred to as "trunks". Each trunk supports a plurality of "channels" which are time slots used by individual calls. Although the STM network is reliable and robust, the demand for voice and other voice-band data services is taxing the capacity of current network facilities.

Consequently an interest has developed in using alternate facilities to complete voice grade connections. Many local exchange carriers (LECs) are experiencing tandem network congestion and are seeking economical ways to grow their tandem networks. Inter-exchange carriers (IECs) would like to consolidate their voice and data traffic on a single multi-service network. The currently most attractive alternate facility is a network which operates in an asynchronous transfer mode (ATM) protocol. ATM has a now matured to an extent that it provides a viable alternative to STM facilities.

ATM uses a fixed data packet size of 53 octets called a "cell". A cell includes a header of 5 octets and a payload of 48 octets for transferring user information. There are known methods for converting STM voice and voice-band call data to ATM cells and vice versa.

Call setup and control in the PSTN is commonly effected using an out-of-band signaling network known as a common channel signaling network. Most of the North American PSTN is equipped to operate with a common channel signaling protocol called Signaling System 7 (SS7). ATM networks, however, use a different signaling protocol in which signaling messages are transported through the network in cells like those used for carrying payload data. The signaling systems of the PSTN and ATM networks are therefore incompatible and STM calls cannot be transferred directly to or from an ATM network.

Methods and apparatus for transferring voice and voice-data services over ATM networks are known, however. One ATM network architecture designed for that purpose is described in U.S. Pat. No. 5,568,475 entitled ATM NETWORK ARCHITECTURE EMPLOYING A COMMON CHANNEL SIGNALING NETWORK, which issued Oct. 22, 1996 to Doshi et al. In the ATM network architecture described by Doshi et al, each switch in the ATM network is equipped with a signal processor that is capable of sending and receiving common channel signaling messages. The signal processor translates STM trunk identification information into ATM Permanent Virtual Circuit (PVC) information to permit STM calls to be transported through the ATM network using virtual trunks. While this ATM architecture provides an option for a migration of PSTN voice services to an ATM protocol, it appears to suffer from certain drawbacks. First, the architecture requires that all ATM switches be enabled with SS7 signaling capability and that the SS7 network overlay the entire ATM network. Second, the use of PVCs in the ATM network has the potential to tie up ATM resources unnecessarily, preventing those resources from being used for other purposes, even during off-peak calling hours.

There therefore exists a need for a method and apparatus for transferring STM calls in a multi-service ATM network which requires only a small investment in infrastructure and ensures efficient use of ATM network resources.

Simply transferring STM calls through an ATM network to relieve congestion in the PSTN is not in itself enough, however. In North America, the current call setup rate is 4,000,000 calls per busy hour and PSTN usage is expected to double over the next five years. Despite the current call volume, call setup within an STM node requires only 20 msec, and service is delivered with 99.999% availability.

There therefore exists a need for a method and apparatus for transferring STM calls in a multi-service ATM network which ensures that calls transferred through the ATM network are rapidly set up so that current PSTN service levels are sustained.

SUMMARY OF THE INVENTION

It is therefore an object of the invention to provide a method of transferring STM calls through an ATM network by provisioning ATM edge nodes with apparatus which is adapted to send, receive and interpret common channel signaling messages related to STM calls and to dynamically map STM trunks to switched virtual circuits in a multi-service ATM network.

It is a further object of the invention to provide a method for transferring STM calls through a multi-service ATM network in which native ATM signaling is used in the ATM network.

It is yet a further object of the invention to provide a method of transferring STM calls through an ATM network in which cached switched virtual circuits (SVCs) are used for STM calls.

It is a further object of the invention to provide a method of transferring STM calls through an ATM network in which cached cross-connections are also used for STM calls.

It is another object of the invention to provide an apparatus for transferring STM calls through an ATM network, the apparatus including a voice interface control unit associated with each edge node in the ATM network.

It is a further object of the invention to provide an apparatus for transferring STM calls through an ATM network which includes a signaling interface to receive and send common channel signaling messages associated with STM calls.

It is yet a further object of the invention to provide an apparatus for transferring STM calls through an ATM network in which the voice interface control unit dynamically maps a trunk channel carrying the cell to an SVC in the ATM network.

It is yet a further object of the invention to provide an apparatus for transferring STM calls through an ATM network in which the voice interface control unit exchanges messages with a peer associated with a destination edge node in the ATM network to enable the peer voice control unit to set up egress of the call from the ATM network to a trunk in the STM network.

In accordance with a first aspect of the invention, there is provided apparatus for enabling the transport of synchronous transfer mode (STM) calls through an asynchronous transfer mode (ATM) network, the apparatus being associated with each edge node in the ATM network designated to serve as a gateway for the STM calls, comprising in combination:

a signaling interface adapted to receive and send common channel signaling messages associated with STM calls transferred to the ATM network;

a voice interface control unit adapted to route calls through the ATM network when an STM call seeks admission at the associated edge node, and to set up egress of a call from the ATM network when the associated node is an ATM destination node for the call; and a TDM peripheral device for terminating STM trunks and converting STM calls to ATM cells and vice versa.

In accordance with a further aspect of the invention, there is provided a method of transferring synchronous transfer mode (STM) calls through a multi-service asynchronous transfer mode (ATM) network comprising:

provisioning ATM edge nodes for the ingress and egress of the STM calls, each edge node having an associated TDM peripheral adapted to convert STM calls to ATM cells and vice versa, a signaling interface adapted to send and receive common channel signaling messages related to STM calls transferred to an associated edge node for admission to the ATM network, and a voice interface control unit which is adapted to route STM calls through the ATM network and setup the egress of STM calls routed through the network by another voice interface control unit; and using native ATM signaling to set up switched virtual circuits between edge nodes for the STM calls.

In accordance with yet a further aspect of the invention, there is provided a method of transferring STM calls through an ATM network, comprising the steps of:

receiving a common channel signaling message at an edge node in the ATM network, the common channel signaling message providing information regarding a calling party and a called party as well as a circuit identification code identifying a trunk channel for delivery of the call to the ATM network, to permit the call to be transferred through the ATM network;

translating at least a portion of a called number in the common channel signaling message into a destination edge node in the ATM network;

allocating a switched virtual circuit (SVC) to transfer the STM call through the ATM network to the destination edge node associated with the called number;

dynamically mapping the SVC to a port associated with the trunk channel;

downloading a first cross-connecting the SVC to the port;

passing the common channel signaling information to the destination edge node;

translating at the destination edge node at least a portion of the called number into an egress STM port for the call;

downloading a second cross connect from the SVC to the egress STM port from the call; and transferring the STM call through the ATM network using the cross-connects and the SVC until a common channel signaling message is received indicating that the call has been terminated.

The invention provides a method and apparatus for transferring STM calls through an ATM network which permits resources in the ATM network to be efficiently used while ensuring that the rapid call setup time now provided by the PSTN is maintained.

In accordance with the method, voice interface control units are provided at edge nodes in the ATM network. The voice interface control units are enabled to communicate with PSTN switches using common channel signaling messages. A signaling interface terminates Message Transfer Part (MTP) layers 2 and 3 for the voice interface control unit. The signaling interface is adapted to receive common channel signaling messages in Integrated Services Digital Network User Part (ISUP) protocol. In response to instructions from the voice interface control unit, it is also enabled to formulate and send ISUP messages. If Local Number Portability (LNP) or other PSTN call features are to be supported, the signaling interface must also be enabled to communicate and receive common channel signaling messages in Transaction Capability Application Part (TCAP) protocol. Likewise, the signaling interface must be enabled to formulate and send TCAP messages in response to instructions from the voice interface control unit in order to query databases for call routing information, or number translation.

In order to efficiently use resources in the ATM multi-service network it is preferable that the edge nodes in the network be equipped to use cached SVCs and cached cross-connects to facilitate call setup while ensuring efficient network resource use.

In all implementations of the invention, native ATM signaling such as BISUP or P-NNI are used in the ATM network. This permits the ATM network to be used for the purposes of offering different high-bandwidth data services while permitting efficient and reliable transfer of STM calls to relieve congestion in inter-exchange carrier or local exchange carrier networks.

BRIEF DESCRIPTION OF THE DRAWINGS

The invention will now be further explained by way of example only and with reference to the following drawings, wherein.

DETAILED DESCRIPTION OF THE PREFERRED EMBODIMENT

This invention relates to a method and apparatus for transferring synchronous transfer mode (STM) network calls through an asynchronous transfer mode (ATM) network. In accordance with the method, edge nodes in the ATM network are equipped with associated voice interface control units and time division multiplex (TDM) peripherals which convert STM calls to ATM cells and vice versa. The voice interface control unit uses a signaling interface to provide a link between a common channel signaling control network of the STM network. The signaling interface handles the Message Transfer Part (MTP) layers of the common channel signal messaging. In the ATM network, and the edge nodes which serve as gateways for voice and voice-data traffic are substantially unmodified. This permits the ATM network to function as a multi-service network which supports application interfaces for other types of data services. The voice and voice-data traffic is therefore completely transparent to the ATM network. It is preferable that the edge nodes be configured to support switched virtual circuit (SVC) caching to enable rapid call setup in order to comply with current PSTN call setup performance and to ensure that setup delays are not experienced during peak call hours. Performance can be further enhanced using cached cross-connects. SVC caching and cross-connect caching are described in applicants' copending application entitled METHOD AND APPARATUS FOR CACHING SWITCHED VIRTUAL CIRCUITS IN AN ATM NETWORK which was filed on Apr. 2, 1998, the disclosure of which is incorporated herein by reference in its entirety.

Figure 1A:
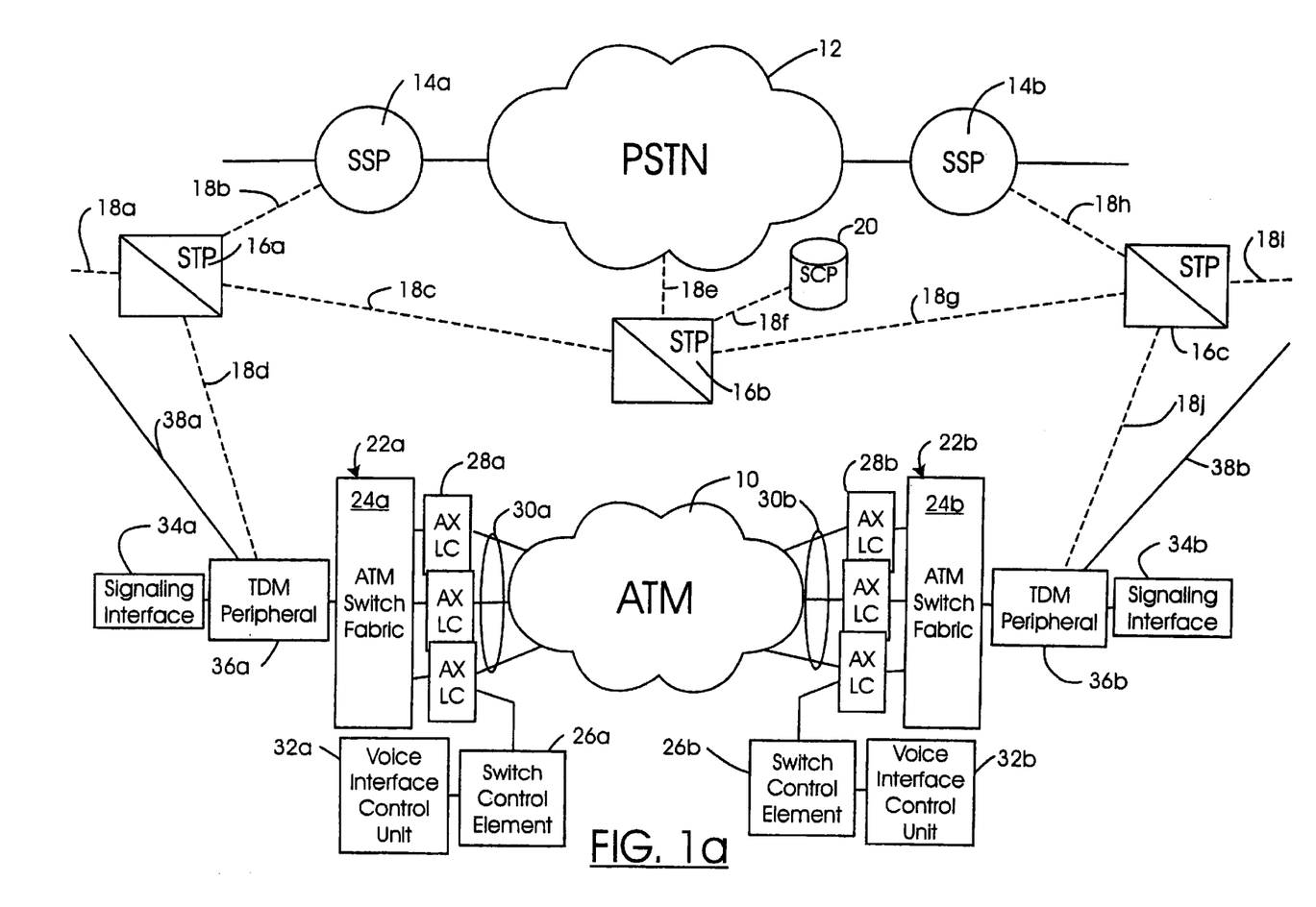
FIG. 1a is a schematic diagram of a first preferred embodiment of the apparatus in accordance with the invention showing the apparatus in relation to a portion of a public switched telephone network.

FIG. 1a is a schematic diagram of the principal components of an apparatus in accordance with the invention shown in one of several potential arrangements with edge nodes of an ATM network 10. The ATM network 10 serves as a transport backbone for many varied data services. The PSTN 12 includes a plurality of time division multiplex switches 14, commonly referred to as service switching points (SSPs). Only two SSPs 14a, b are shown in FIG. 1. The SSPs 14a, b shown in FIG. 1 are tandem service switching points used to route interswitch calls in the PSTN. Such SSPs are found, for example, in local exchange carrier (LEC) tandem networks as well as in inter-change carrier (IEC) networks.

The apparatus in accordance with the invention is primarily intended for relieving congestion in the PSTN 12 and for permitting both LECs and LECs to grow their networks economically.

As is well understood, in the art, the PSTN 12 includes and is largely controlled by an out-of-band signaling system known as a common channel signaling system. The common channel signaling system includes a plurality of signal transfer points (STPs) 16a–c which transfer common channel signaling messages between network nodes over common channel signaling links 18a–j The network nodes include, for example, SSPs 14a,b and a service control point (SCP) 20. The SSPs 14a,b exchange call control information over the common channel signaling links 18b,c,g and h for call setup and call release. The STPs 16a,b,c minimize the number of signaling links 18a–j required by serving as tandem switches in the signaling network to route messages to their destination. The SSPs 14a,b are also enabled to send query messages to the SCP 20 in order to obtain routing information for special service calls. Query messages may also be sent to the SCP 20 for number translations to support network functions such as Local Number Portability (LNP).

The ATM network 10 operates with an asynchronous transfer mode protocol in which connections are established using virtual circuits. Virtual circuits share facilities in a prioritized schedule determined by each circuit's quality of service (QOS). The ATM network 10 includes a plurality of switching nodes 22a,b. The switching nodes 22a,b generally include an ATM switch fabric 24a,b controlled by a switch control element 26a,b. Auxiliary line cards (AX LC) 28a,b provide ingress/egress ports for transport links 30a,b in the ATM network 10. The construction of ATM switches 22 and ATM networks 10 is well known in the art.

The apparatus in accordance with the invention provides an interface between the ATM switches 22a,b and the PSTN 12 to provide gateways for transferring voice-grade traffic to and from the ATM network 10. The apparatus in accordance with the invention includes a voice interface control unit 32a,b and a signaling interface 34a,b. A prior art device commonly referred to as a TDM peripheral 36a,b is required to terminate STM trunks 38 and to convert STM voice and voice data calls into ATM cells, as is well understood in the art. The TDM peripheral 36a,b generally includes Digital Signal Processing (DSP) service circuits which are responsible for tone generation/detection; digit collection/generation on the capture of Dual Tone Modulated Frequency (DTMF), or Multiplex Frequence (MF) signaling, etc. The DSP is also responsible for the collection of call progress digits. Other DSP functions include the playback of recorded announcements, voice bridging for multi-cast and conference calling; fax/modem detection; silence suppression and comfortable noise generation; echo cancellation, etc. The TDM peripheral 36 also includes an adaptor section which provides a connection point for STM DS0 and T1, T3 and larger sizes up to 0C3 trunks, as well as functionality to convert STM calls to ATM calls.

There are several options for connecting the TDM peripheral 36a,b to the ATM switch fabric 24a,b. The preferred option is a direct fibre interface which connects to the ATM switch fabric. This option delivers an integrated ATM multi-service switch while reducing cost. To implement this option, the TDM peripheral 36a,b must include a fibre interface which emulates the AX LCs 28a,b. Since all traffic handled by the TDM peripheral is admitted as committed bit rate (CBR) traffic, traffic management is simple and memory requirements are therefore minimized. This permits a TDM peripheral 36a,b in accordance with the invention to be inexpensively constructed.

The voice interface control unit 32a,b controls voice traffic ingress to and egress from the ATM network 10. In order to accomplish the ingress/egress of voice traffic, the voice interface control unit 32a,b manages the switched virtual circuits (SVCs) required for voice calls. In the method in accordance with the invention, voice calls are routed over SVCs at a CBR to ensure efficient management of network resources in a multi-service ATM network. By using SVCs rather than permanent virtual circuits (PVCs), unused network capacity is available for other services supported by the network. As is well known in the art, SVCs tie up network resources only so long as they are in use. Once released, the network resource is freed for use by any other service. The voice interface control unit 32a,b also manages address translation between North American Dialing Plan (NADP) addresses, also referred to as E.164 addresses, and an ATM destination address required to route the call through the ATM network 10. There are several options for address translation and routing, as will be explained below in more detail.

The voice interface control unit 32a,b interfaces with the switch control element 26 to request and confirm SVC setup. It also provides the necessary information for SVC setup such as the ATM called address when voice calls are routed through the ATM network 10. In addition, the voice interface control unit 32a,b manages the cross-connections between an STM trunk channel identified by a circuit identification code (CIC), and an SVC set up to carry a call through the ATM network 10. The CIC is received in an Integrated Services Digital Network User Part (ISUP) message. ISUP is a subset of the common channel signaling protocol known as SS7. The voice interface control unit 32a,b preferably also manages SVC caching and selection as described in applicants' copending patent application referenced above.

Figure 1B:
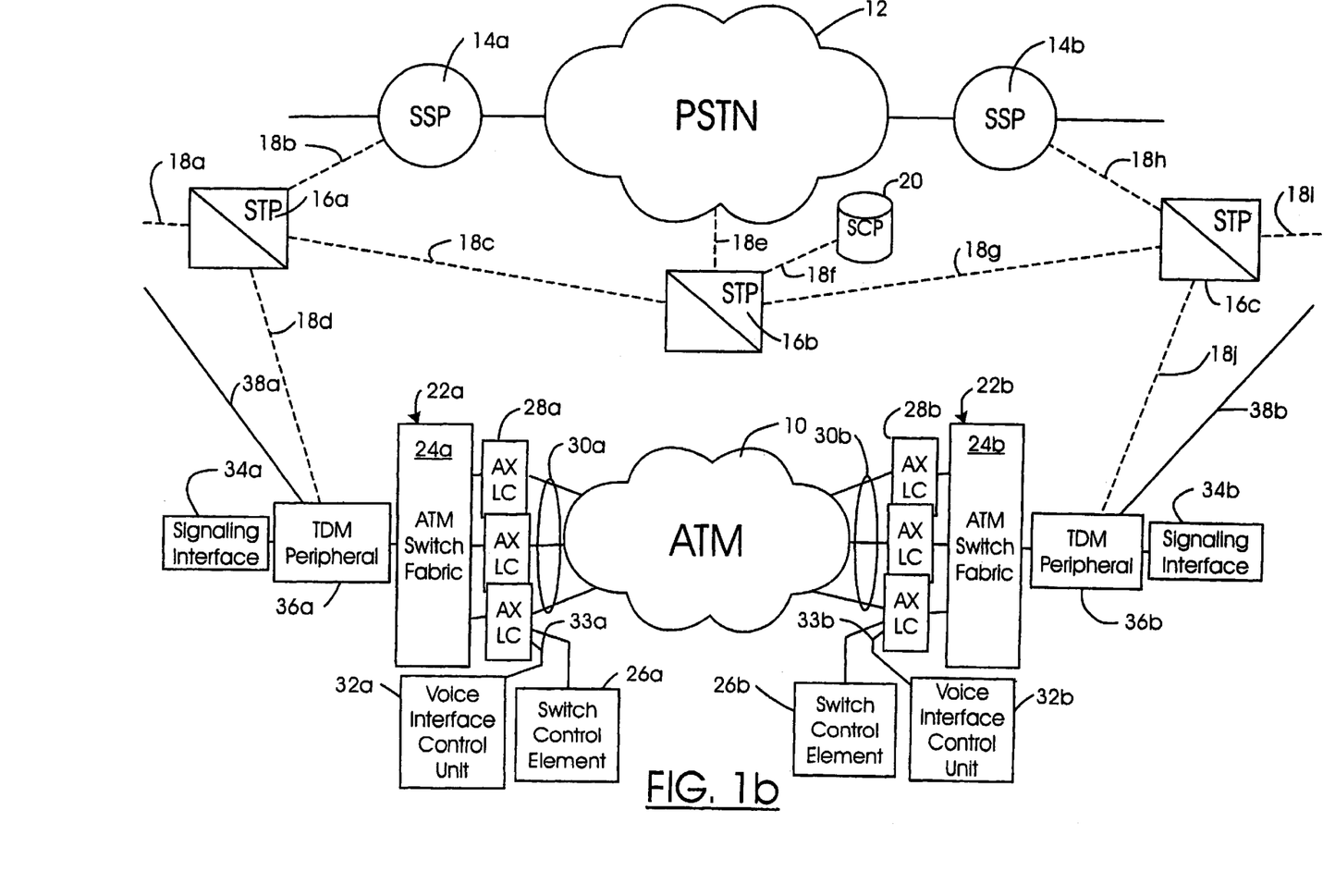
FIG. 1b is a schematic diagram of a second preferred embodiment of the apparatus in accordance with the invention showing the apparatus in relation to a portion of a public switched telephone network.

As shown in FIG. 1a, the voice interface control unit 32a,b may be closely coupled with the switch control element. In a second preferred embodiment shown in FIG. 1b, the voice interface control unit 32b is a stand-alone computing machine with its own ATM transfer link 33a,b to an AX LC 28a,b. In the embodiment shown in FIG. 1b, all communications between the switch control element 26a,b and the voice interface control unit 32a,b are through the ATM switch fabric 24a,b. In all other respects, the embodiment shown in FIGS. 1a and 1b are identical.

In accordance with the method of the invention, the voice interface control unit 32a,b is owner of an address assigned to the TDM peripheral 36a,b and registers that address with the switch control element 26a,b using processes which will be described below in more detail with reference to FIG. 3. The address registered is a concatenation of the ATM switch prefix address plus the common channel signaling point code assigned to the voice interface control unit 32a,b.

An interface is required between the voice interface control unit 32a,b and the switch control element 26a,b. Several options may be adopted for a signaling protocol at the interface. For example, ATM User Network Interface (UNI) signaling can be used. ATM UNI is a standard ATM signaling message protocol but the functionality for this application is limited because a flexible cross-connect download command is absent and the protocol has performance drawbacks. As an alternative, B-ISUP could be used but the number of signaling layers to be treated detract from its appeal. Likewise, the ATM signaling system Protocol for Network to Network Interface (P-NNI) is not preferred because constructing a designated transit list required for P-NNI is considered to be unduly complex for this application.

Proprietary switch messaging could be used but requires the implementation of certain features to be described below such as the download of half-leg virtual circuit releases, which are generally not supported by ATM switching equipment.

Figure 2:
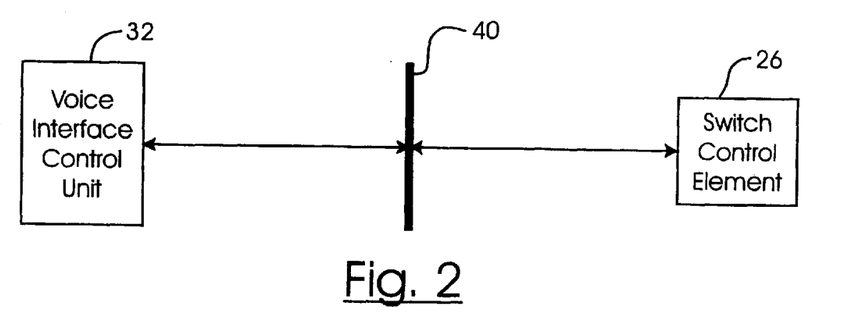
FIG. 2 is a schematic diagram of a preferred interface between a voice interface control unit in accordance with the invention and a switch control element of an ATM edge node in an ATM network.

Several standards-based options could also be used for this application. For example, one standards-based option is the use of ATM native service Application Programming Interface (API) primitives to which are added a custom cross-connect download message. The ATM API primitives are a set of standard primitives that can call the native ATM SVC service. The API published by the ATM forum is intended for use by the applications in a host on the user side of UNI to request the SVC services. The API is suitable for supporting non-ATM services on an ATM multi-service switch because the voice control unit 32a,b using API primitives emulates the functionality of an application host requesting ATM SVC services from the ATM multi-service switches 22a,b. FIG. 2 shows a schematic diagram of the API interface 40 which permits message exchange between the switch control element 26a,b and the voice interface control unit 32a,b.

Figure 3:
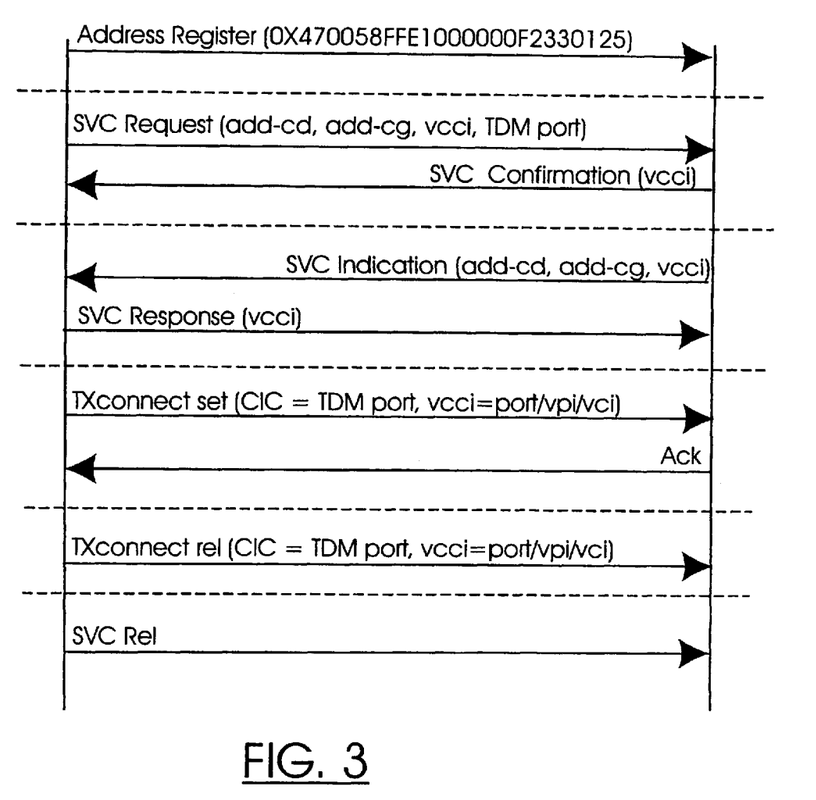
FIG. 3 is a schematic diagram showing application program interface messages exchanged between the voice interface control unit and the switch control element in accordance with a preferred embodiment of the invention.

FIG. 3 is a schematic diagram of the principal messages exchanged between the voice interface control unit 32a,b and the switch control element 26a,b using the API interface 40. API interface 40 permits the voice interface control unit 32a,b to register addresses in an initialization or update process. During the process, the voice interface control unit 32a,b registers as application agent for the TDM peripheral 36a,b and informs the switch control element 26a,b of the address which it has been assigned. When using the "address register" primitive, the voice interface control unit 32a,b passes the concentrated address (ATM switch prefix and point code) to the switch control element 26a,b.

The switch control element 26a,b on receipt of the "address register" message records the address in its message control tables. Thereafter, whenever a signaling message or a call is received having an address matching the registered address, it is passed to the voice interface control unit 32a,b for further processing.

In addition to address registration, the API interface 40 permits the voice interface control unit 32 to request SVC services. This includes SVC setup which is initiated by an SVC Request command in which the voice interface control unit 32a,b requests an SVC using the "add-cd" (address) prefix of the destination ATM switch plus the point code of the destination voice interface control unit 32a,b and the "add-cg" (address prefix of the origination ATM switch plus the point code of the origination voice interface control unit 32a,b). The contents of the address variables will be explained below in more detail. When the voice interface control unit 32a,b sends an SVC request, the switch control element 26a,b normal responds with an SVC confirmation in which the address of the calling and called parties are returned along with a virtual circuit identification code (VCCI). An SVC request is used by the voice interface control unit 32a, for example, when a call is received from the PSTN by the TDM peripheral 36a.

If an incoming SVC setup is received by the ATM switch fabric 24a, the switch control element 26a examines the called party address and determines that it is owned by the voice interface control unit 32a. The switch control element 26a after processing the SVC for the incoming ATM ports sends an SVC Indication message to the voice interface control unit 32a which includes the called party address (add-cd), the calling party address (add-cg) and the VCCI. The calling party and called party addresses are the concentrated address described above, ATM switch prefix plus voice interface control unit point code. On receipt of the SVC Indication message, the voice interface control unit 32a responds with an SVC Response message in which the address parameters are repeated. The use of the SVC indication and response messages will be described below in more detail.

In the method in accordance with the invention, it is frequently necessary for the voice interface control unit 32a,b to request a half-leg cross-connection download from the switch control element 26. A half-leg cross-connect download is used to complete the cross-connect which has been setup with only one port in the cross-connect table of a resource manager for the ATM switch fabric 24a,b. In order to accomplish this, an "TXconnect set" command is used (FIG. 3). The TXconnect set message carries a TDM port identification number and a VCCI which includes an ATM port number/virtual path identifier/virtual circuit identifier. On receipt of an Xconnect set, the switch control element 26a,b performs the requested half-leg cross-connect by connecting the TDM port with the reserved ATM port/vpi/vci and returns an acknowledge (ACK) message indicating that the operation has been successfully completed.

It may also be necessary for the voice interface control unit 32a,b to disconnect a half-leg cross-connect for reasons which will be explained in more detail below with reference to FIGS. 6 and 7. In order to accomplish this, the voice interface control unit 32 uses the "TXconnect rel" message (FIG. 3). The TXconnect rel message carries the same parameters of port identification number and VCCI. Only the TDM port is released. The ATM port/vpi/vci that corresponds to the VCCI is still reserved as a half-leg cross-connect. The TXconnect rel message does not have to be acknowledged and the voice interface control unit 32a,b doessnot expect an acknowledgment.

The signaling interface 32a,b is logically closely coupled with the voice interface control unit 32a,b although they are physically separated. The DS0 signaling link(s) 18d,j of the common channel signaling system preferably respectively terminate on DS0 ports of the TDM peripheral 36a,b. Common channel signaling messages received on link 18d,j are passed to the signaling interface 34a,b by the TDM peripheral 36a,b. The signaling interface 34a,b provides the narrow band signaling interface and protocols which permit the common channel signaling link 18d,j to be terminated. The signaling interface 34a,b is responsible for terminating SS7 MTP2 and MTP3 layers. It receives ISUP messages and removes the data required by the voice interface control unit 32a,b for call processing. The signaling interface 34a,b packs the data into ATM cells using any appropriate internal messaging protocol which permits the voice interface control unit 32a,b to determine the type and content of the message. The ATM calls are then forwarded through the ATM switch fabric 24a,b to the voice interface control unit 32a,b, which uses the data to set up or release SVCs for a call. The voice interface control unit 32a,b may also send instructions and data packed in ATM cells to the signaling interface 34a,b to request that the signaling interface 34a,b formulate and send an ISUP message required for call control in the PSTN 12.

The signaling interface 34a,b may also be enabled to originate and terminate Transaction Capabilities Application Part (TCAP) protocol messages and, if required, formulate TCAP queries in response to requests by the voice interface control unit 32a,b. This permits the voice interface control unit 32a,b to query the SCP 20 if the voice interface control unit 32a,b determines that a call requires special treatment or address translation.

Call Control Messaging

Call Setup with SVC Setup

In order to illustrate the use of the apparatus in accordance with the invention, several detailed call control message flows illustrating call setup and call release are described below.

Figure 4:
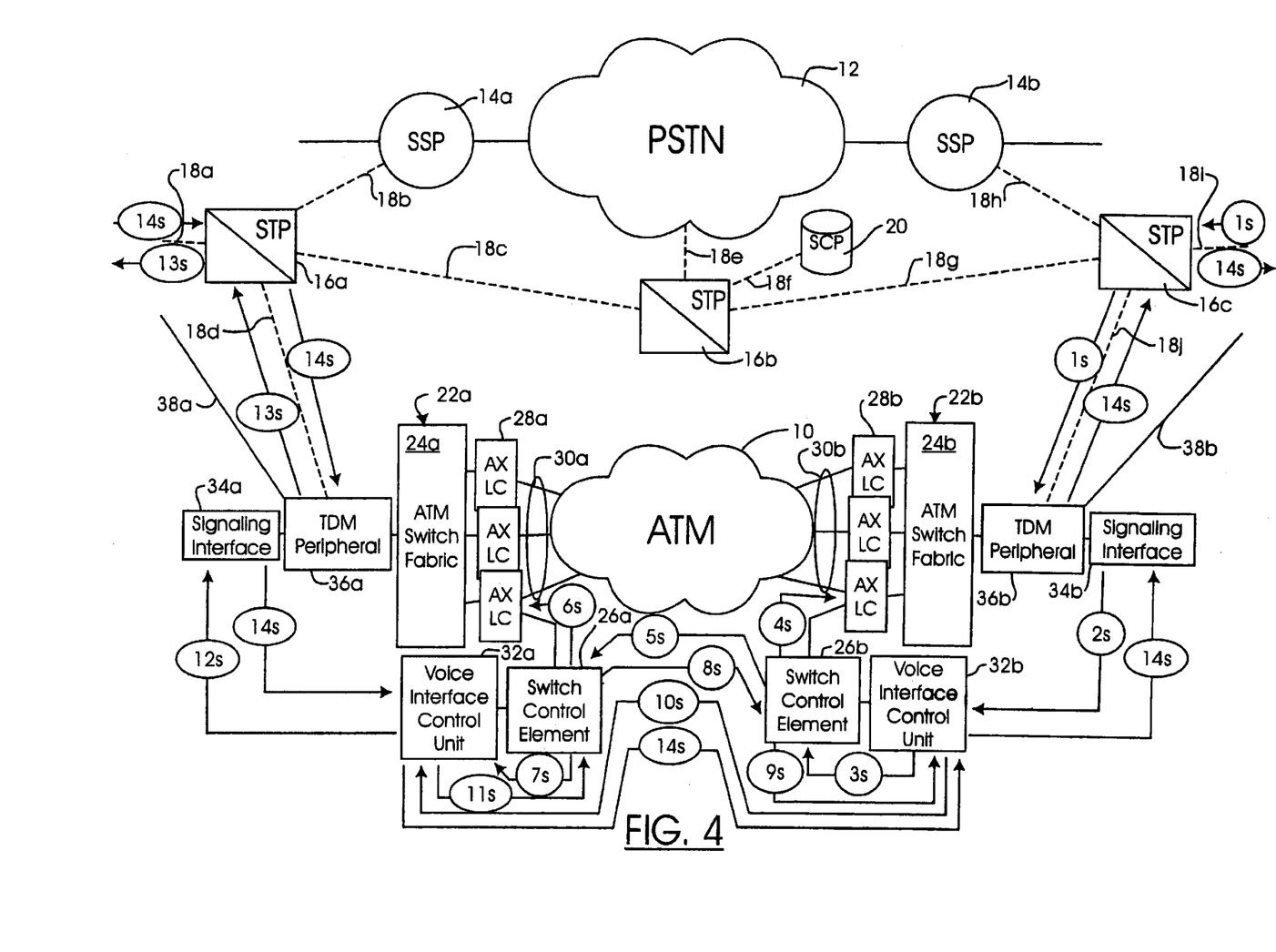
FIG. 4 is a schematic diagram of a call control message flow between call originating and terminating components of the PSTN and the apparatus in accordance with the invention at edge nodes in an ATM network during STM call setup.

FIG. 4 is a schematic diagram of a high level overview of the message flow involved in a call setup using the method and apparatus in accordance with the invention. In the message flow shown in FIG. 4, in step 1s an ISUP IAM message originating from an SPC (not illustrated) in a LEC network, for example, arrives at STP 16c on signaling link 18i. The STP 16c examines the destination point code of the message and forwards the message over signaling link 18j in the second part of step 1s to the TDM peripheral 36b. On receipt of the ISUP message, the TDM peripheral 36b passes the ISUP message to the signaling interface 34b. The signaling interface 34b removes call control information from the ISUP message and packs that information into ATM cells which are through ATM switch fabric 24b to the voice interface control unit 32b which extracts the call control information and interprets the ISUP message. This entire process is schematically represented by step 2s in FIG. 4. After interpreting the ISUP message data, the voice interface control unit 32b determines that the ISUP message is an IAM requesting admission to the ATM network 10 by the voice call from the LEC network. In response to the message, the voice interface control unit 32b examines the called number to determine whether call feature treatment is required. In this example, the call is a simple non-featured call and call feature treatment is not required. If call feature treatment were required, the voice interface control unit 32b would send ATM cells to the signaling interface 34b requesting that it formulate a TCAP message addressed to the SCP 20 to obtain the required translation or routing information. The voice interface control unit 32b is also enabled to send an ISUP Release (REL) message to release the call to the originating PSTN SSP if the called number relates to a service which the voice interface control unit 32b is not enabled to provide. The originating PSTN SSP may then forward the call into the PSTN network 12 for a normal STM call completion.

A virtual circuit is required to route the call to the destination edge node 22a. In order to establish the required virtual circuit, the voice interface control unit 32b must determine an appropriate destination edge node in the ATM network for egress of the call. The identification of the destination edge node is determined using an E.164 address to ATM address mapping table, shown in Table 1.

TABLE 1

E.164 Address to ATM Address Mapping Table.

| Called Party Number | Destination Voice Interface Control Unit Point Code | Destination ATM Node Address |
|---|---|---|
| 613-xxx-xxxx | P2 | AESA2 |
| ... | ... | ... |

The E-164 address is the called number from the ISUP IAM message. The called number is used to determine the point code of the destination voice interface control unit 32a and the address of the destination ATM node. After the destination address is located, the voice interface control unit 32b consults Table 2 to locate an available VCCI to be assigned to the call.

TABLE 2

VCCI Resource Table

| VCCI | In Use (1) | Peer Voice Interface Control Unit Point Code | Peer ATM Node Address |
|---|---|---|---|
| x1 | 0 | | |
| x2 | 1 | P3 | AESAx |
| ... | ... | ... | ... |

Table 2 is examined to find an unoccupied VCCI for use in transferring the call through the ATM network 10. The voice interface control unit 32b then marks the VCCI as "in use" and formulates an SVC Request which is forwarded to the switch control element in step 3s. In the SVC Request, the voice interface control unit 32b indicates the incoming STM port for the trunk channel carrying the STM call which it locates using a circuit identification code (CIC) that it obtains from the ISUP IAM message. The trunk to STM port ID mapping is performed using a table lookup, the table having a structure similar to Table 3.

TABLE 3

Trunk to STM Port ID Mapping Table

| CIC | STM Port ID |
|---|---|
| 001 | A1 |
| 002 | A2 |
| ... | ... |

On receipt of the SVC Request message in step 3s, the switch control element 26b processes the incoming request by validating the required parameters and consulting routing tables to located preferred routes to the called ATM edge note 22a. The preferred routes are used to select the outgoing port through which the SVC is to be set up. The switch control element 26b then compiles resource information for both the incoming call from the TDM peripheral 36b and the outgoing switched virtual circuit. Switch control element 26b passes the call resource information of incoming/outgoing port ID in step 4s to a resource manager (not illustrated) which controls the ATM switch fabric 24b and the AX LCs 28b. The resource manager performs call admission control and allocates the resources required for the call. The resource manager also downloads the cross-connect from the voice trunk channel in trunk 38b on TDM peripheral 36b to the ATM switch fabric and downloads a cross-connect from the ATM switch fabric 22b to the outgoing port on the AX LC 28b using resource tables well known in the art. If any of the resource allocations fail, a reject signal is returned to the switch control element 26b. Otherwise, the resource manager sends a "confirmation" message back to the switch control element 26b. The confirmation message includes an index to indicate that the requested allocation was successful. Due to space constraints, the confirmation message is not shown.

The switch control element 26b then formulates an ATM signaling message for an SVC setup and send it in step 5s via the signaling in an ATM network 10 to a next switch in the TM network 10 to initiate the SVC setup. The SVC setup proceeds across the ATM network 10 in accordance with procedures well understood in the art. Call allocation resource and SVC setup must be accomplished at each node in the call path. After the ATM network 10 is traversed by the SVC Request message, it is received by the switch control element 26a. The switch control element 26a analyzes the SVC Request message and requests the resource manager of ATM switch fabric 24a in step 6s to admit and allocate the resource on the incoming ATM AX LC 28a. The switch control element 26a then sends an incoming SVC Indication message to the voice interface control unit 32a in step 7s, because the called address in the SVC setup request belongs to the voice interface control unit 32a.

On receipt of the SVC Indication message, the voice interface control unit 32a determines that it has an incoming SVC and it updates its VCCI resource table with an "in use" indication (Table 2) and it creates a record of the SVC in a memory table, the structure of which is shown in Table 4. The originating ATM node address and the originating PC stored in Table 4 are extracted from the add-cg field of the SVC setup message. When these values are stored in Table 4, the "occupied" field is set to zero because the voice interface control unit does not know at that time if the SVC will be used for a call.

TABLE 4

SVC Record Table

| Peer Voice Interface Control Unit Point Code | Peer ATM Node Address | VCCI | Occupied | Trunk Characteristics |
|---|---|---|---|---|
| P1 | AESA1 | x1 | 1 | DS0/CBR |
| ... | ... | ... | ... | ... |

Then the voice interface control unit 32a sends a response to switch control element 26a to accept the SVC. Otherwise, the voice interface control unit 32a may reject the incoming SVC based on any predetermined control policy, if a control policy is instituted. For example, certain originating addresses may be disallowed.

In step 8s, the switch control element 26a returns an ATM signaling message back to the switch control element 26b indicating a successful SVC setup. When the switch control element 26b receives the successful SVC setup message, it informs the voice interface control unit 32b in step 9s, using an SVC confirmation message (FIG. 3), that the SVC to the destination was set up as requested. When the voice interface control unit 32b receives confirmation that it now has a virtual connection to the destination edge node 22a, it updates its VCCI resource table (Table 2) to record the destination voice interface control unit's PC and destination ATM address. The voice interface control unit 32b then sends an ISUP IAM message to the destination voice interface control unit in step 10s to the voice interface control unit 32a. The ISUP IAM may be sent via the signaling interface 34b, the signaling link 18j, STP 16c, signaling link 18g, STP 16b, signaling 18c, STP 16a and signaling link 18d, etc. Alternatively and preferably, the ISUP IAM information is packed in the ATM cells and sent through the ATM network to the voice interface control unit 32a. In the ISUP IAM information, regardless of the path over which it is transferred, the CIC is set to the VCCI of the SVC set up for the call, i.e. CIC=x1. If the ISUP message is routed through the ATM network 10, it is preferably routed over a pre-established PVC designated for carrying ISUP call control messages.

When the voice interface control unit 32a receives the IAM information, it uses the CIC (VCCI=x1) to check its ATM incoming SVC table (Table 4) to verify that the VCCI=x1 originated from the same point code as the SVC being held for the call. The voice interface control unit 32a then performs a routing table lookup to determine which trunk(s) serves the called number in the ISUP message. In this example, the table (not illustrated) indicates that the call should be routed to trunk 38a and an SSP in a terminating PSTN network (not illustrated). Using a table similar to Table 3, the voice interface control unit 32a maps the trunk ID to an STM port ID (port A) on the TDM peripheral 36a. In step 11s, the voice interface control unit 32a sends an TXconnect set request to the switch control element 26a requesting a half-leg cross-connect download to cross-connect the SVC identified by the VCCI=X1 with outgoing port A on the TDM peripheral 36a. On receipt of the TXconnect set message in step 11s, the switch control element 26a uses an internal mapping table, shown as Table 5 to obtain the incoming port/vpi/vci associated with the SVC identified by the VCCI sent in the TXconnect set message.

TABLE 5

VCCI Mapping Table in Switch Control Element

| Originating PC | Originating ATM Switch Address | VCCI | Incoming Port/vpi/vci |
|---|---|---|---|
| P1 | AESA1 | x1 | C1/vp1/vc150 |
| ... | | | |

The switch control element 26a then requests the resource manager of ATM switch fabric 24a to download the cross-connect to interconnect AX LC 28a and the TDM peripheral 36a. If the cross-connect download is successful, the switch control element 26a informs the voice interface control unit 32a of the successful cross-connect. The voice interface control unit 32a then formulates ATM cells which are forwarded in step 12s to the signaling interface 34a instructing the signaling interface 34a to prepare an ISUP IAM message to be sent over signaling link 18d via STP 16a and signaling link 18a to the terminating PSTN network SSP that an incoming call is arriving on trunk 38a. The IAM message is sent by the signaling interface 34a in step 13s.

On receipt of the IAM message, the destination SSP (not illustrated) examines the called number to determine the destination of the call. The destination SSP forwards the call towards its destination if it does not serve the called number. In any event, the destination SSP will return an ISUP Address Complete (ACM) message if the called party's telephone is determined to be available and an ISUP Answer (ANM) message when the called party goes off-hook. The path of the ACM and ANM messages is indicated by steps 14s in which the ACM and ANM messages are sent via signaling link 18b to STP 16a and via signaling link 18d to the signaling interface 34a. The signaling interface 34a extracts the call control information from the respective messages and packs the information extracted from each message in ATM cells which are forwarded through the ATM switch fabric 24a to the voice interface control unit 32a. The voice interface control unit 32a forwards the respective messages through the ATM network 10 to its peer voice interface control unit 32b which repeats the steps of forwarding the messages back to the originating SSP. Thereafter conversation ensues between the calling and called parties.

Call Setup with Cached SVC's

Figure 5:
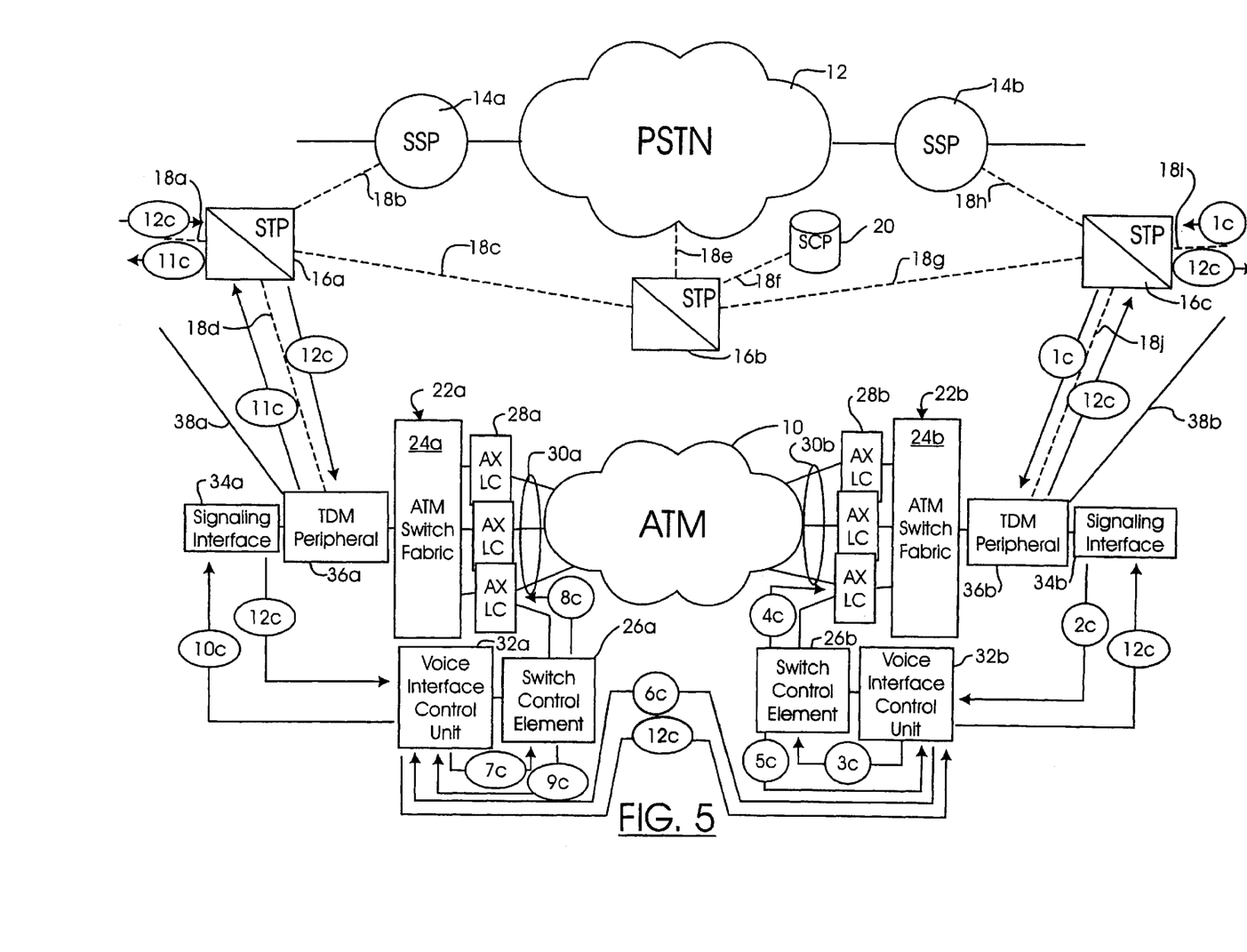
FIG. 5 is a schematic diagram showing a call control message flow during call setup in which cached SVCs are used for call completion through the ATM network.

FIG. 5 presents a high-level overview of a call setup sequence in which cached SVCs are used in accordance with the method described in applicants' copending patent application incorporated herein by reference. The call setup shown in FIG. 5 commences when an IAM is received in step 1c at STP 16c via signalling link 18i. The STP 16c forwards the IAM over signaling link 18j in the second part of step 1c to the TDM peripheral 36b, which passes the message to signaling interface 34b. The signaling interface terminates the MTP layers of the message and extracts call control information required by the voice interface control unit 32b to process the admission request. The signaling interface 34b then forwards the information in step 2c through ATM switch fabric 22b to the voice interface control unit 32b. On receipt of the ISUP IAM message, the voice control unit examines the called number to determine if special call treatment is required. In this example, the call is an unfeatured voice call, so the voice interface control unit 32b sends a request to its SVC selector (not illustrated) to determine whether a cached virtual circuit exists from the AX LC 28b to a AX LC 28a. As explained in applicants' copending application, the SVC selector maintains a table of cached SVCs (Table 4) by destination point code and ATM switch prefix. In this example, the SVC selector returns an unoccupied SVC to the required destination which may be used for the connection. The voice interface control unit 32b in step 3c therefore requests the switch control element 26b to download a half-leg cross-connect from the port which terminates trunk 38b to the SVC identified by VCCI=x, as described above with reference to FIG. 4. In response, the switch control element 26b in step 4c requests the resource manager of ATM switch fabric 24b to download the cross-connect. On confirmation that the cross-connect was successful, switch control element 26b responds in step 5c to the voice interface control unit 32b with an acknowledgement that the cross-connect was successful. Consequently, the voice interface control unit 32b formulates ATM packets containing ISUP IAM information which it forwards through the ATM network 10 in step 6c to the voice interface control unit 32a or through the SS7 network as an IAM message. The CIC carried in the message is the VCCI of the selected SVC. On receipt of the ISUP IAM information, voice interface control unit 32a checks its Table 4 to verify that it has an SVC identified by the given VCCI to the point code of voice interface control unit 32b, and on positive verification performs a table lookup to determine an outgoing port on TDM peripheral 36a to which the call should be routed. In step 7c the voice interface control unit 32a requests that switch control element 26a download a half-leg cross-connect to link the SVC to the port on TDM peripheral 36a which terminates the voice trunk 38a. The switch control element 26a in step 8c requests that the resource manager download the cross-connect. When the resource manager verifies that the cross-connect was successfully downloaded, switch control element 26a in step 9c returns confirmation to the voice interface control unit 32a. On receipt of the confirmation, the voice interface control unit in step 10c formulates ATM cells instructing the signaling interface 34a to send an ISUP IAM message to the destination SSP information the SSP that it has an incoming call on trunk 38a. The signaling interface 34a formulates the ISUP IAM message and forwards it in steps 11c to STP 16a over signaling link 18d. The STP 16a forwards the message over signaling link 18a to the SSP. On receipt of the ISUP IAM message, the SSP examines the called number to determine where the call should be terminated. If the called number is not served by the SSP, the SSP formulates another IAM message and forwards it to a terminating switch. In any event, if the called party line is available an ACM message is returned from the SSP to the originating SSP in steps 12c in the manner described above with relation to FIG. 4. An ISUP ANM message is also returned via the same path after the called part answers the call, as is well understood in the art.

The difference in the call setup message flow using cached SVCs is the establishment of a switched virtual circuit through the ATM network 10 and the confirmation that the SVC has been set up (steps 5s and 8s in FIG. 4). Those two steps can be quite time-consuming if a plurality of nodes are transversed in the route between edge nodes 22b and 22a. The use of cached SVCs therefore significantly improves call setup time while ensuring that a minimum of unused ATM network resources are reserved, as explained in detail in applicants' copending patent application.

Message Flow in Call Release Sequences

Call Release with SVC Release

Figure 6:
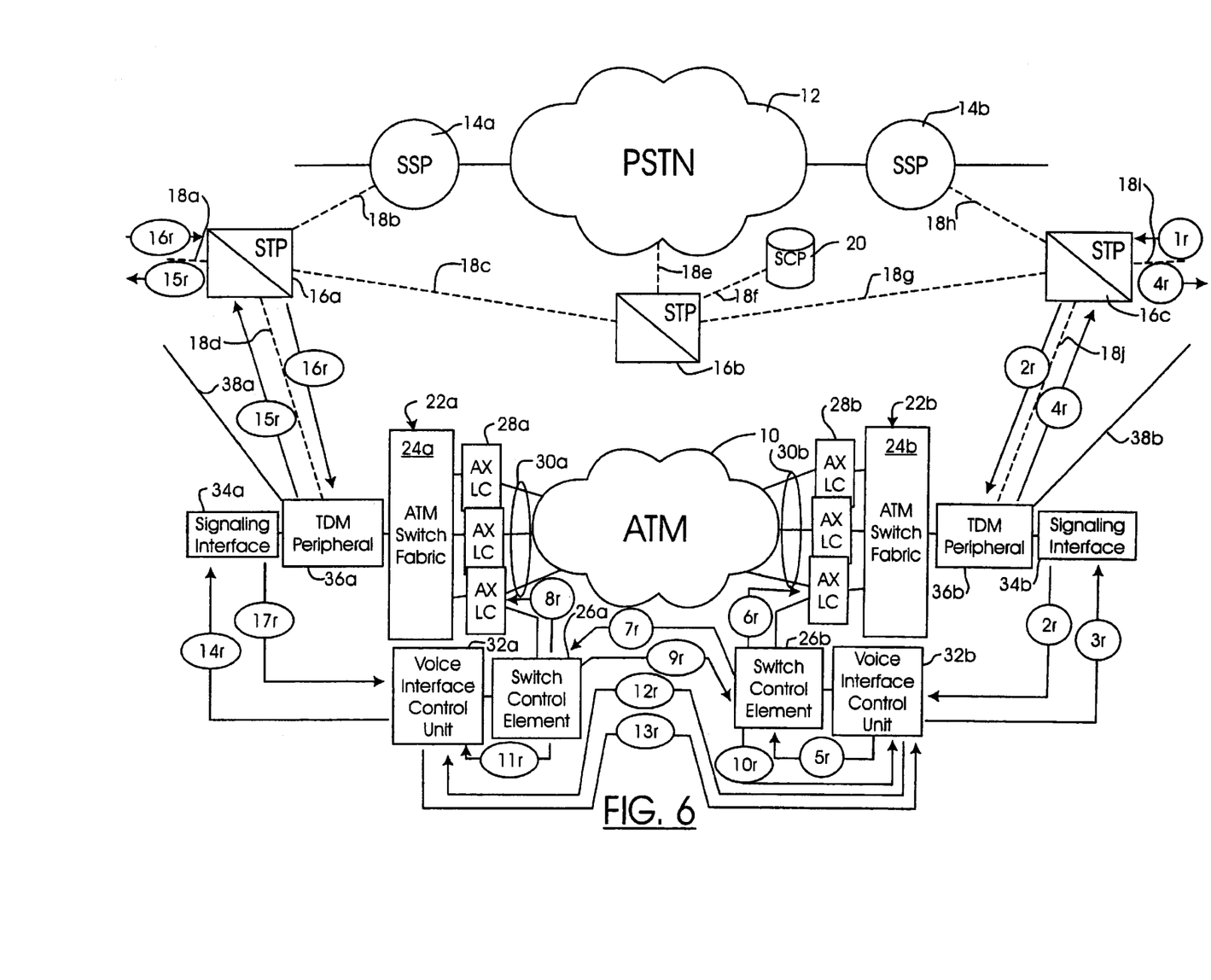
FIG. 6 is a schematic diagram showing call control message flow in a call release sequence in which the SVC used for call completion through the ATM network is released.

FIG. 6 shows a schematic high-level diagram of a call release sequence in which an SVC is released on call termination. In step 1r, an ISUP REL message is received via signalling link 18*i* at STP 16*c*, indicating that the calling party has gone on-hook. The STP 16*c* forwards the message in the second part of step 1*r* to TDM peripheral 36*b*. The TDM peripheral 36*b* passes the message to the signaling interface 34*b* which terminates the MTP layers of the message and extracts the call control information which it forwards in ATM packets in step 2*r* to the voice interface control unit 32*b*. On receipt of the ATM packets containing the REL message information, the voice interface control unit 32*b* in step 3*r* returns ATM packets instructing the signaling interface 34*b* to formulate a ISUP RLC message which is sent back to the origination SSP in steps 4*r*. Subsequently, the voice interface control unit 32*b* releases the call and passes the SVC to the SVC selector which together with the SVC caching manager determines that the SVC used for the call should be released, because either SVCs are not cached or the number of cached SVCs exceeds a predetermined threshold.

The voice interface control unit 34*b* therefore sends a request in step 5*r* to the switch control element 26*b* to release the SVC with VCCI=x. On receipt of the request, the switch control element in step 6*r* requests the resource manager of ATM switch fabric 24*b* to release the cross-connect from the TDM peripheral 36*b* to the AX LC 28*b*. The switch control element 26*b* in step 7*r* therefore formulates an ATM signaling message which it forwards through the ATM network 10 requesting release of the SVC. The corresponding entries in Tables 2 and 4 are also deleted. As each ATM switch in the ATM network 10 is traversed, the resources allocated to the SVC are released and the SVC is deleted from local tables. When switch control element 26*a* receives the release request, it downloads a cross-connect release in step 8*r* and formulates a release complete ATM signaling message which it returns towards switch control element 26*b* in step 9*r*. The switch control element 26*b* then returns a release complete indication to the voice interface control unit 32*b* in step 10*r*. The switch control element 26*a* informs the voice interface control unit 32*a* in step 11*r* that the SVC has been released. The voice interface control unit 32*a* then deletes the corresponding entries in its Tables 2 and 4.

The voice interface control unit 32*b* formulates ISUP Release (REL) message information which it places in ATM packets and forwards in step 12*r* through ATM network 10 to the voice interface control unit 32*a*. On receipt of the ISUP REL message information, the voice interface control unit 32*a* verifies that VCCI=x has been released. It then returns an ISUP Release Complete (RLC) message in step 13*r* to its peer voice interface control unit 32*b*. Thereafter, the voice interface control unit 32*a* prepares ATM packets which are forwarded in step 14*r* through the ATM switch fabric 24*a* to the signaling interface 34*a* instructing the signaling interface 34*a* to prepare an ISUP Release message addressed to the terminating SSP. The signaling interface 34*a* prepares the ISUP REL message and forwards it in steps 14*r* over signaling links 18*d* and 18*a* to the SSP. On receipt of the REL message, the terminating SSP formulates an ISUP RLC message which it returns by the same path in steps 16*r*. On receipt of the RLC message, the signaling interface 34*a* terminates the MTP layers and extracts the call control information which it returns to the voice control unit 32*a* in step 17*r*.

The release of the SVC is thereby complete and confirmed so that the resources reserved by the ATM SVC are thereafter available to other users of the ATM network 10.

Call Release with Cached SVC

Figure 7:
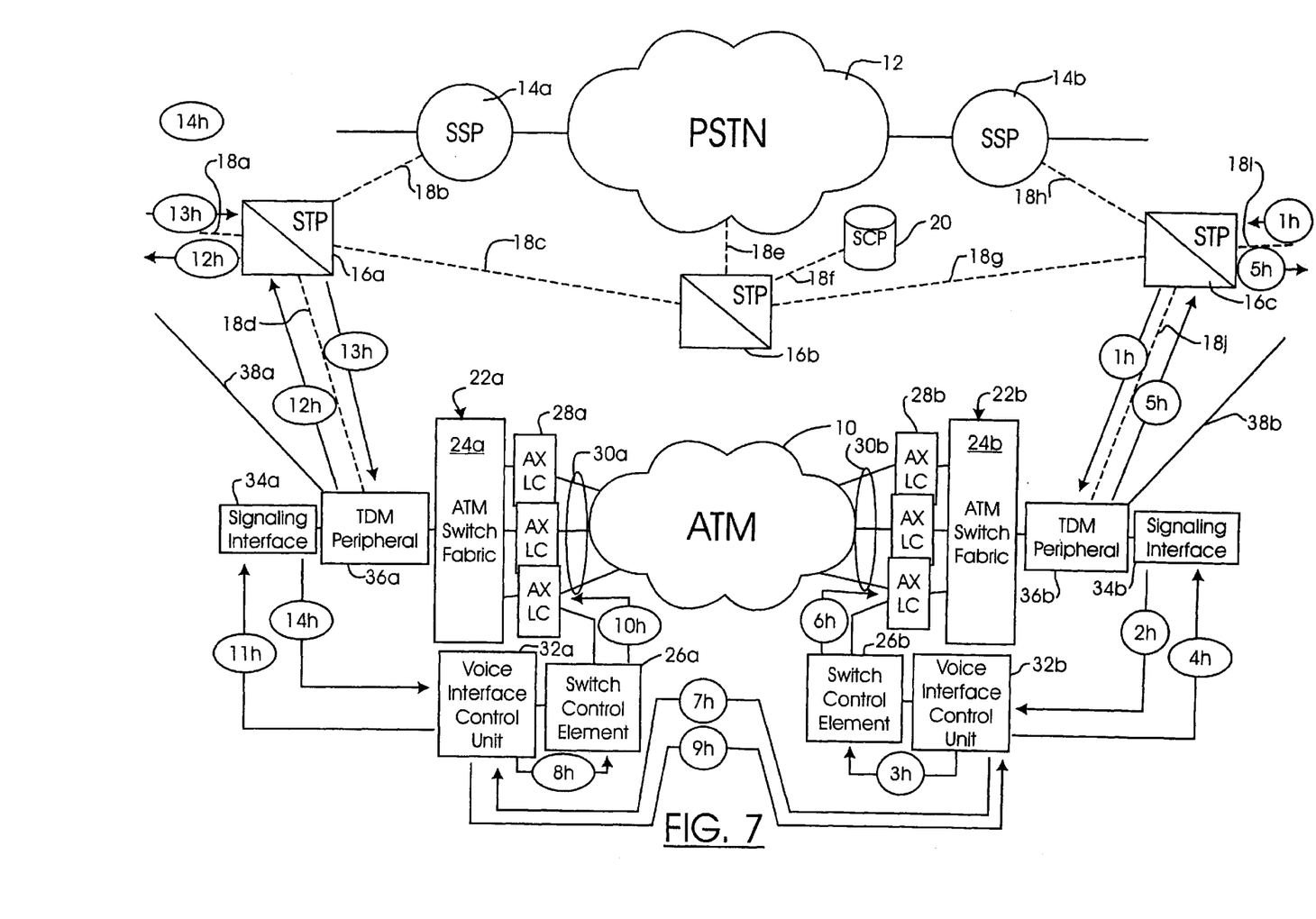
FIG. 7 is a schematic diagram of a call control message flow in a call release sequence in which the SVC used for the STM call is cached on call release for use by subsequent calls between the same edge nodes in the ATM network.

FIG. 7 shows an overview of a call release sequence in which the SVC used to complete the call through the ATM network 10 is cached for future use by another call to the same destination. In the call sequence shown in FIG. 7, an ISUP REL message is received over signaling link 18*i* by STP 16*c* in step 1*h* from an originating PSTN SSP (not illustrated). The STP 16*c* examines the destination point code and determines that the REL message should be forwarded in the second part of step 1*h* to the TDM peripheral 36*b*. On receipt of the message, the TDM peripheral 36*b* passes it to the signaing interface 34*b*. The signaling interface 34*b* terminates the MTP layers of the message and extracts the call control information which it packs in ATM cells and forwards through the ATM switch fabric 24*b* to the voice interface control unit 32*b* in step 2*h*.

On receipt of the REL message, the voice interface control unit 32*b* advises its SVC caching manager of the call release. The caching manager, as explained in applicants' copending patent application, examines its cache tables and determines that the SVC should be cached. The caching manager therefore instructs the switch control element in step 3*h* that the half-leg cross-connect from the port on TDM peripheral 36*b* to the AX LC 28*b* should be released. The SVC segment from AX LC 28*b* to the destination is cached for future use, and is not released. Thereafter, the voice interface control unit 32*b* in step 4*h* instructs the signaling interface 34*b* to formulate an ISUP RLC message and return it to the LEC SSP. The signaling interface 34*b* formulates the RLC message and returns it in steps 5*h* to the originating SSP. The voice interface control unit 32*b* then formulates ATM packets containing ISUP REL message information which it forwards in step 7*h* to the peer voice interface control unit 32*a*. On receipt of the ISUP REL message, the voice interface control unit 32*a* verifies that the VCCI is still in Table 4 and in step 8*h* sends a TXconnect rel message (FIG. 3) to the switch control element 26*a* requesting that it download a half-leg disconnect of the cross-connect from the AX LC 28*a* to the DS0 port on TDM peripheral 36*a*. Subsequently, the voice interface control unit 32*a* formulates ATM packets containing ISUP RLC message information which it returns in step 9*h* to its peer voice interface control unit 32*b*. The voice interface control unit 32*a* then formulates ATM cells instructing, in step 11*h*, the signaling interface 34*a* to prepare an ISUP REL message towards the destination SSP. The signaling interface 34*a* formulates the ISUP REL message and forwards it in steps 12*h* through STP 16*a* to the terminating SSP via signaling links 18*d* and 18*a*. On receipt of the ISUP REL message, the terminating SSP formulates and returns an ISUP REL message in steps 13*h* to the TDM peripheral 36*a*. TDM peripheral 36*a* passes the ISUP Release Complete message to the signaling interface 34*a*. The signaling interface 34*a* terminates the MTP layers of the message and extracts the call control information which it returns in step 14*h* to the voice interface control unit 32*a*.

At the conclusion of the steps shown in FIG. 7, a cached virtual circuit exists between AX LC 28*b* and AX LC 28*a*. When a next call arrives requiring an SVC from the same ATM source to the same ATM destination, or vice versa, the call can be rapidly set up in accordance with the sequence of events described above in relation to FIG. 5 using the cached SVC.

As will be understood by those skilled in the art, the method and apparatus described above enable the support of PSTN features for calls routed for transfer through an ATM network. The method and apparatus also have the advantage that separate call control and ATM SVC control operate to minimize the impact of transferring voice services to ATM networks. This permits the ATM network 10 to be available for other data services. Since native signaling is used in the ATM network, equipping ATM edge nodes to admit STM calls is easily and inexpensively effected. In addition, if the method of SVC caching and cross-connect caching are practised in accordance with the teaching of applicants' copending patent application, voice calls may be rapidly established through the ATM network which permits service providers to maintain expected call connect times even during peak calling hours.

Changes and modifications to the above-described embodiments will no doubt be apparent to those skilled in the art. The scope of the invention is therefore intended to the limited solely by the scope of the appended claims.

We claim:

1. Apparatus for enabling the transport of synchronous transfer mode (STM) calls through an asynchronous transfer mode (ATM) network, the apparatus being associated with each edge node in the ATM network designated to serve as a gateway for the STM calls, comprising in combination:
    a signaling interface adapted to receive and send common channel signaling messages associated with STM calls transferred to the ATM network;
    a voice interface control unit adapted to route calls through the ATM network when an STM call seeks admission at the associated edge node, and to set up egress of a call from the ATM network when the associated node is an ATM destination node for the call; and
    a TDM peripheral device for terminating STM trunks and converting STM calls to ATM cells and vice versa.

2. Apparatus as claimed in claim 1 wherein to route calls through the ATM network, the voice interface control unit is adapted to:
    a) determine a destination edge node in the ATM network for a call;
    b) dynamically map a trunk channel carrying the call to a switched virtual circuit (SVC) in the ATM network;
    c) request a cross-connect download at the associated edge node to logically connect the trunk channel with the SVC; and
    d) exchange messages with a peer voice interface control unit associated with the destination edge node to enable that voice interface control unit to set up egress of the call from the ATM network to a trunk in the STM network.

3. Apparatus as claimed in claim 1 wherein each voice interface control unit is assigned a point code in a common channel signaling network of the STM network and an ATM AESA address in the ATM network to facilitate processing of SVC terminations.

4. Apparatus as claimed in claim 3 wherein the point code and the AESA address are concatenated for addressing purposes in the ATM network.

5. Apparatus as claimed in claim 1 wherein the voice interface control unit is a computing machine which is closely coupled with a switch control element of the associated ATM switch.

6. Apparatus as claimed in claim 5 wherein common channel signaling messages addressed to the point code of the voice interface control unit are received by the signaling interface, and the signaling interface extracts call control information from the message and packs the information in ATM cell(s) that are transferred through a fabric of the edge node to the voice interface control unit.

7. Apparatus as claimed in claim 6 wherein the signaling interface and the TDM peripheral are implemented together, the TDM peripheral providing an STM port for the termination of a common channel signaling link on which the common channel signaling messages are transferred.

8. Apparatus as claimed in claim 1 wherein the voice interface control unit is associated with a switch control element of the edge node in the ATM network, and the switch control element communicates with a switch fabric of the edge node through an ATM transfer link.

9. Apparatus as claimed in claim 1 wherein the voice interface control unit is a stand alone computing machine which has an independent ATM transfer link to a port on an auxiliary line card of the associated edge node.

10. Apparatus as claimed in claim 1 wherein the edge node and all other nodes in the ATM network communicate using a native ATM signaling protocol.

11. A method of transferring synchronous transfer mode (STM) calls through a multi-service asynchronous transfer mode (ATM) network comprising:
    provisioning ATM edge nodes for the ingress and egress of the STM calls, each edge node having an associated TDM peripheral adapted to convert STM calls to ATM calls and vice versa, a signaling interface adapted to send and receive common channel signaling messages related to STM calls transferred to an associated edge node for admission to the ATM network, and a voice interface control unit which is adapted to route STM calls through the ATM network and setup the egress of STM calls routed through the network by another voice interface control unit; and
    using native ATM signaling to set up switched virtual circuits between edge nodes for the STM calls.

12. A method of transferring STM calls through an ATM network, comprising the steps of:
    receiving a common channel signaling message at an edge node in the ATM network, the common channel signaling message providing information regarding a calling part and a called part as well as a circuit identification code identifying a trunk channel for delivery of the call to the ATM network, to permit the call to be transferred through the ATM network;
    translating at least a portion of a called number in the common channel signaling message into a destination edge node in the ATM network;
    allocating a switched virtual circuit (SVC) to transfer the STM call through the ATM network to the destination edge node associated with the called number;
    dynamically mapping the SVC to a port associated with the trunk channel;
    downloading a first cross-connect to connect the SVC with the port:
    passing the common channel signaling information to the destination edge node;
    translating at least a portion of the called number into an egress STM port for the call;
    downloading a second cross-connect to connect the SVC with the egress STM port from the call; and
    transferring the STM call through the ATM network using the cross-connects and the SVC until a common channel signaling message is received indicating that the call has been released.

13. A method as claimed in claim 12 wherein the common channel signaling message is received at the edge node by a signaling interface associated with a TDM peripheral device that terminates STM trunks connected to the edge node, and the signaling interface extracts call control information from the common channel signaling message and passes the call control information in at least one ATM cell to a voice interface control unit which allocates the switched virtual circuit for the call.

14. The method as claimed in claim 12 wherein allocating a switched virtual circuit for the call involves a one of selecting a cached switched virtual circuit from a table of available cached switched virtual circuits, and setting up a switched virtual circuit through the ATM network using an ATM signaling protocol native to the ATM network.

15. The method as claimed in claim 12 wherein the dynamic mapping of the switched virtual circuit to the port associated with the trunk channel involves translating the circuit identification code received in the common channel signaling message to a port number on a TDM peripheral device and replacing the circuit identification code with a VCCI and forwarding the common channel signaling message to a destination ATM node where the VCCI is translated into an ATM port/vpi/vci which carries the STM call.

* * * * *